United States Patent [19]

Stelzer et al.

[11] Patent Number: 4,505,984
[45] Date of Patent: Mar. 19, 1985

[54] COMPOSITE RUBBER-URETHANE TANK TRACK PADS TO IMPROVE SERVICE LIFE

[75] Inventors: Gary J. Stelzer, Coldwater; Calvin Harmon, III, St. Marys, both of Ohio

[73] Assignee: The Goodyear Tire & Rubber Company, Akron, Ohio

[21] Appl. No.: 630,139

[22] Filed: Jul. 12, 1984

[51] Int. Cl.³ .................. B32B 15/06; B32B 15/08; B32B 27/08; B32B 27/28
[52] U.S. Cl. ................. 428/424.7; 428/424.8; 428/461; 428/462
[58] Field of Search ............. 428/424.7, 424.8, 461, 428/462

[56] References Cited

U.S. PATENT DOCUMENTS 4,062,997 12/1977 Hotta et al. ................... 428/461
4,136,219 1/1979 Odam et al. .................. 428/424.7
4,369,225 1/1983 Manabe et al. ............... 428/424.8
4,410,595 10/1983 Matsumoto et al. .......... 428/424.7

Primary Examiner—William J. Van Balen
Attorney, Agent, or Firm—J. D. Wolfe; R. D. Thompson

[57] ABSTRACT

A track segment for track vehicles composed of a metal plate or binocular part having at least one layer of an olefin or diolefin elastomer adhered thereto or covering said metal part and at least one or more layers of a polyurethane adhered to said elastomer, with at least an outer layer of polyurethane serving as part or all the ground contact or sole.

6 Claims, 9 Drawing Figures

COMPOSITE RUBBER-URETHANE TANK TRACK PADS TO IMPROVE SERVICE LIFE

TECHNICAL FIELD

This invention relates to improved tank track pads or related load bearing pads and to the method of making the same.

PRIOR ART

Modern tanks such as the so-called M-1, or M-60 to name a few models, are vehicles weighing in some cases over 45,500 Kg and have tracks whose pad failures are a major share of the track repair and replacement costs. These costs are projected to rise with the heavier vehicles.

The current pads have a cured compounded elastomer, usually a carbon black loaded butadiene-styrene rubber, molded as a shoe over the individual metallic track segments which have holes for the pins for connecting to the individual track segments to form the track for said vehicle. Some embodiments of tracks for some vehicles have pads that are replaceable while others are an integral part of the metallic segment. These pad failures occur by tearing, chunking and abrading in one mode, but in another mode of failure the pad fails due to heat build-up and the rubber appears to be lost or destroyed due to internal explosions in the rubber or so-called heat build-up. The prior art pads comprised two parts a rubber part bonded to the metal part.

THE INVENTION AND HOW TO PRACTICE IT

This invention comprises a new pad composed of a metallic track part having a rubber element bonded thereto with a sole of polyurethane bonded to said rubber element giving at least a three segmented pad having a metal, a rubber layer and a urethane ground contact layer or sole.

The nature of this invention can be better understood and appreciated by reference to the drawings wherein FIG. 1 is a cross-sectional view through a track segment, used on the M-60 tank.

Figure 1:
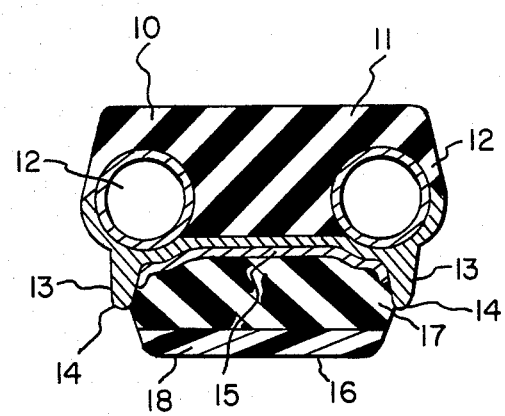
Figure 2:
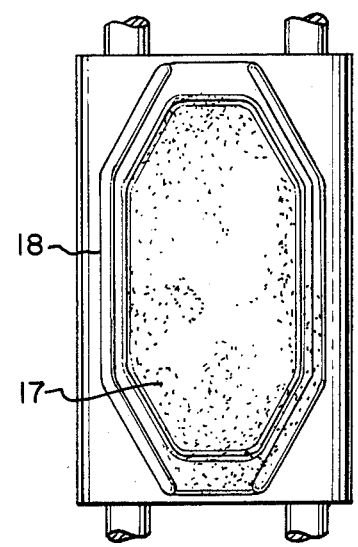
FIG. 2 is a plan view of the track segment of FIG. 1.

The nature of this invention can be more readily understood by referring to FIG. 1 where the numeral 10 designates the track segment composed of a road wheel path member 11 having two openings 12 generally referred to as the bionoculars in the metal member 13 and a pair of projection points 14 from the metal member number 13, also generally called grousers which retains the backing plate 15 having a laminated rubber pad 16 as a sole. The binoculars are used to mount the track segments on pins (not shown) to form the track to be used on the track vehicle such as the M-60 tank. The pad 16 of this invention is a laminate having a layer 17 of an elastomeric material of the diene type or related olefinic elastomer adhered to the steel plate 15, and a polyurethane ground contact element 18 adhered to layer 17.

Figure 3:
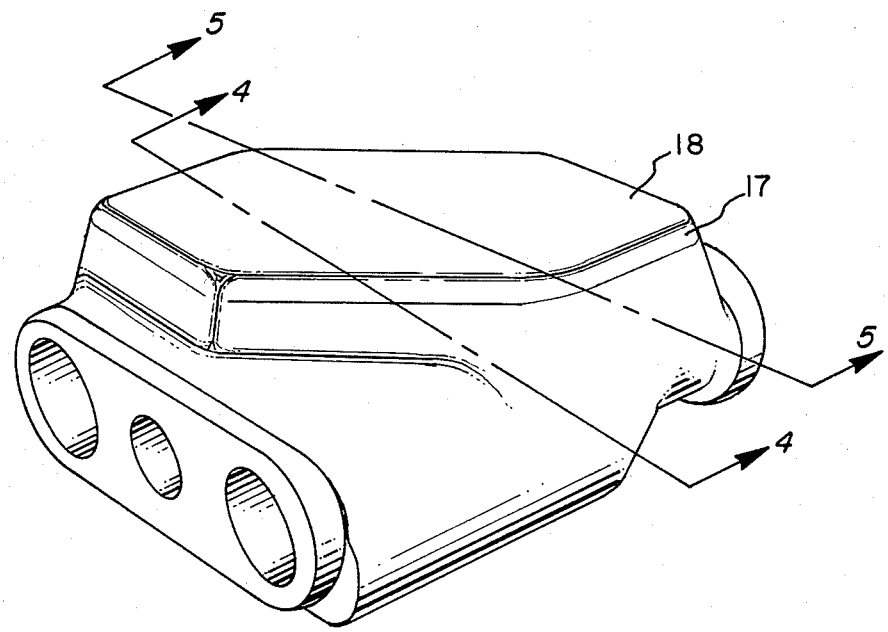
FIG. 3 is a perspective view of the tank track shoe used on the M1 tank.
Figure 4:
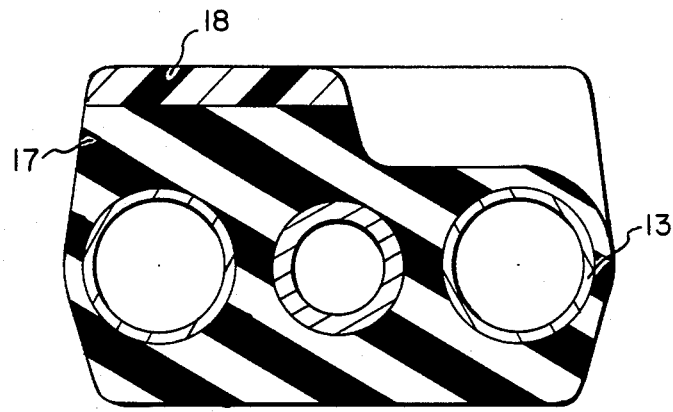
FIG. 4 is a cross-sectional view of FIG. 3 along lines 4—4.
Figure 5:
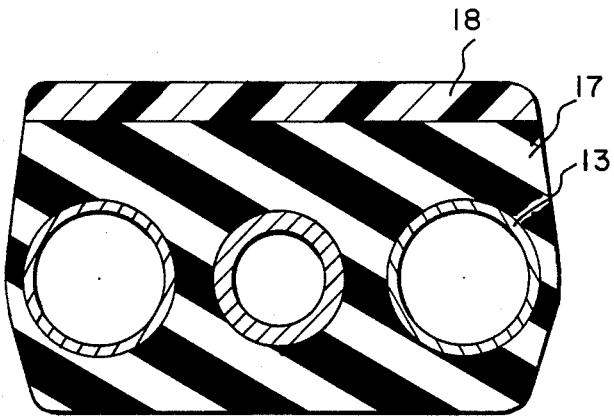
FIG. 5 is a cross-sectional view of FIG. 3 along lines 5—5.
Figure 6:
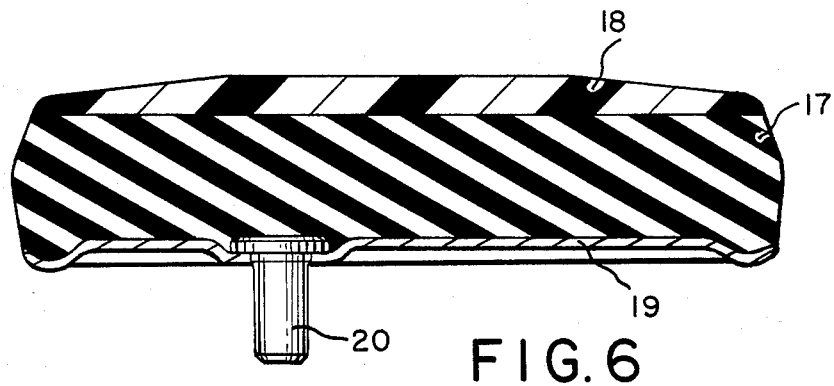
FIG. 6 is a side view of the pad segment as viewed in FIG. 1 showing the lamination to give improved service life of the road side track shoe unit.

Referring again to FIGS. 3, 4 and 5, the embodiment of the invention as adapted for the track of a Model M-1 tank is shown with the metal base 13 being encapsulated in the diene or olefin elastomer 17 and the polyurethane ground contact element 18 adhered to the diene or olefin elastomer. FIG. 6 shows a replaceable pad used on the M-60 model tank with the diene or olefin rubber 17 adhered to the metal plate 19 which has a pin 20 for attachment to the metal track element. The sole part of polyurethane 18 is adhered to the rubber layer 17.

The metal plate or metal binocular part is preferably washed or blasted or chemically cleaned to give a clean surface for bonding the elastomer to the metal. These are well known metal cleaning steps. Then the diene or olefin rubber is applied to the metal and cured, in manner normally done to produce the tank pad having a carbon black loaded butadiene/styrene elastomer bonded to the metal of the pad. Preferably the surface of the elastomer bonded to the metal of the pad is abraded with 120 grit sandpaper and then treated with a primer such as the well known Chemlok TM 7701 from Lord Chemical Co., a 3% solids solution of cyanuric acid in a solvent such as ethyl acetate. Then to the dry treated surface an adhesive is applied such as TS4010-23 adhesive from Lord Chemical Co or the familiar phenol-formaldhyde adhesive. Then the urethane cap or sole is applied and adhered to the elastomer with the adhesives. The track element prepared in this way is more resistant to chunking and heat build-up than the conventional element having on it a diene or olefin rubber cover on the metal.

One adhesive that may be employed in forming high temperature resistant bonds between the above described polyurethane elastomers and metal is a mixture of (A) a resinous copolymer of from 50 to 80% by weight of styrene and from 50 to 20% by weight of acrylonitrile and (B) polyisocyanates more fully described in U.S. Pat. No. 2,683,730.

Another adhesive that may be used comprises (1) a polyepoxy compound, having a viscosity at 25° C. of at least 0.5 poises, either dissolved or dispersed in (2) a vehicle together with (3) a modifying agent which acts to enhance the ability of the epoxy resin to wet and/or cover a metal surface. These modifying agents may function by increasing the viscosity of the mixture of epoxy resin with the vehicle or by lowering the surface tension to permit the epoxy resin to wet the metal surface. In some cases the modifying agent may be thought of as modifying, either physically or chemically, the film on the metal surface or the film with the polyurethane elastomer or the olefin-diolefin elastomer.

The diene or olefin elastomers useful in this invention are well known and have been used for years on track vehicles as pads. The material currently used in tank track pads is sytrene butadiene rubber (SBR) loaded carbon black as a reinforcing filler. The properties of the diene and/or olefin elastomers, as is known, can vary over a wide range, depending largely on the amount and type of carbon black and the cross-link density of the rubber polymer such as butadiene/styrene, polybutadiene, polyisoprene, EPDM rubber to name a few of these that are well known.

The polyurethanes useful in this invention are the reaction product of a polyester polyol or a polyether polyols with an organic polyisocyanate such as methane di(phenylisocyanate) and its polymeric forms viz, PAPA types, naphthalene diisocyanates and others well known and used polyisocyanates. These prepolymers are usually cured with polyamines and polyols, with ethylene glycol, butane diol and dialkanol carbamates and trialkanol carbamate being used with blends of the glycols such as 1,4-butane diol.

The polyurethanes such as those used for the well known solid polyurethane tires used on fork lift truck type vehicles are well suited for use in the lighter weight vehicles. Also, the polyurethanes used to make shock absorbing pads such as those described in Dr. Daniel A. Chung's U.S. Pat. Nos. 4,073,858, 4,311,765, and 4,164,251, exhibit great resistance to high energy impacts and could be used to make the urethane sole of the instant invention pad.

Particularly desired polyurethanes are those created by reacting methane di(phenylisocyanate)tolidine diisocyanate or naphthalene diisocyanate with a reactive hydrogen material selected from polytetramethylene ether glycol, polycaprolactone ester polyol and the mixtures of these.

Prepolymer preparation that is very desired is as follows: The three polyols were melted by heating in an oven at 150°–160° F. overnight. A two-liter resin reactor was charged with 300.0 g. (MW1000) polytetramethylene ether glycol, 660.0 g. (MW2000) polytetramethylene ether glycol and 660.0 g. (MW2000) polycaprolactone ester polyol. The resin was stirred and degassed at a vacuum of less than 1 mm Hg, while the temperature was raised to 100°–105° C. Degassing at this temperature was continued for about 20 minutes to remove all the moisture in the resin. The temperature was then raised to 116° C. and 16.5 g. 2,6-Di-tert-butyl-p-cresol and 394.35 g. 1,5-naphthalene diisocyanate were immediately added to avoid prolonged exposure of the polyols at high temperatures. Degassing was resumed at once. The temperature of the reaction mixture first dipped to 102° C. and during the next ten minutes the exotherm of the isocyanatehydroxyl reaction carried the temperature to 128° C. The flask was cooled immediately to bring the temperature to about 100° C. The isocyanate content was then determined to be 3.4% as compared to the theoretical value of 3.61%.

A number of metal binocular parts and metal plates were cleaned by abrading with grit blast of medium grade or chemical agents. Then the clean metal parts were primed with the well known metal primers such as the phenolic and phenolic aldehyde resin types. The clean dry metal plate, preferably primed, had a standard layer of carbon black load butadiene/styrene rubber track composition adhered thereto and cured by use of an adhesive such as those described in U.S. Pat. No. 2,992,939 or Australian Pat. No. 256,373. The preferred primer is a solution of cyanuric acid.

To clean metal plates or metal binocular parts primed and coated with adhesive a layer of a cured or uncured compounded olefin or diolefin elastomers was placed thereon and heated to cure the adhesive and adhere the elastomer thereto.

The surface of the elastomer adhered to the metal was abraded with grit blast of medium grade to roughen the surface. Then an adhesive such as ones described above was applied then a cast polyurethanes sole was placed thereon and cured to give a finished pad.

A particular preferred track segment is one made with the conventional carbon black loaded butadiene styrene elastomer adhered to the metal and having a cast polyurethane adhered thereto, said polyurethane being the reaction product of a prepolymer of 1,5-naphthalene diisocyanate and a blend of polytetramethylene ether glycol of 800 to 1200 molecular weight, a polytetramethylene ether glycol of 1800 to 2200 molecular weight and polycaprolactone of 1800 to 2200 molecular weight with a curative of a blend of a glycol of bis(-betahydroxyethyl)hydroquinone ether and trimethylol propane.

Figure 7:
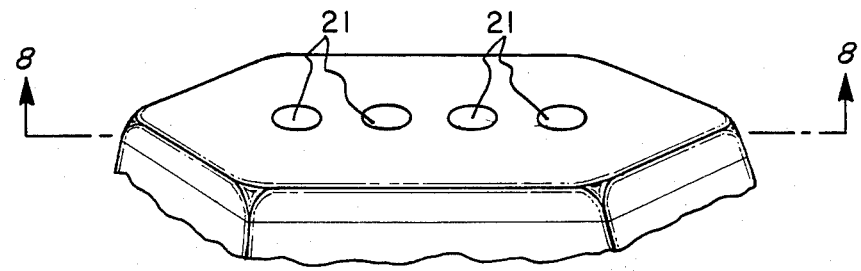
FIG. 7 is a partial perspective view of a special embodiment of this invention where the elastomer of the layer adjacent the sole part extends through holes in the sole part, which can give a Swiss cheese appearance.
Figure 8:
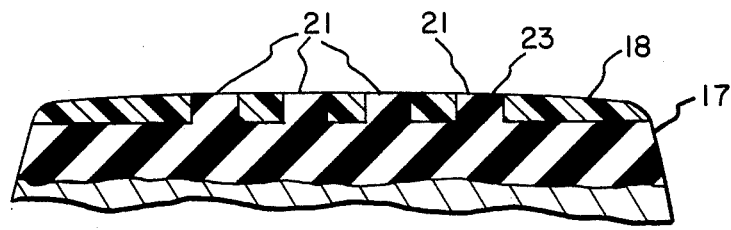
FIG. 8 is a cross-sectional view of FIG. 7, along lines 8—8.
Figure 9:
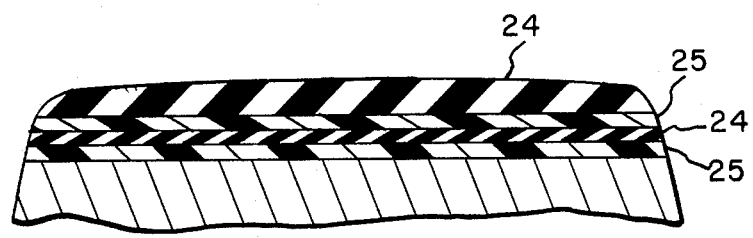
FIG. 9 is a partial cross-sectional view of another special embodiment of the invention showing more than three layers with the elastomer layer and the polyurethane layers in multiple alternating layers.

Referring specifically to FIGS. 7, 8, and 9, it will be noted that the polyurethane sole member 18 has a number of holes 21 where the elastomer 17 extends up therein to fill the holes and thus modify the traction of the pads on various surfaces. In FIG. 8, the elastomer layer 17 is shown projecting into holes 21 to give plugs 23 of elastomer therein. In FIG. 9 the polyurethane and elastomer are shown in alternate layers 24 and 25 of polyurethane and elastomer respectively.

While certain representative embodiments and details have been shown for the purpose of illustrating the invention, it will be apparent to those skilled in this art that various changes and modifications may be made therein without departing from the scope of the invention.

What is claimed is:

1. A track segment having a metallic base with a diene or olefin elastomer adhered thereto and a sole member of polyurethane adhered to said elastomer.

2. The track segment of claim 1 wherein the sole member of polyurethane has holes through which the diene or olefin elastomer projects into the sole area.

3. The track segment of claim 1 wherein alternate layers of diene or olefin elastomer and polyurethane are used to give a sole member of polyurethane.

4. The track segment of claim 1 wherein the polyurethane is the reaction product of 1,5 naphthalene diisocyanate with a blend of polytetramethylene ether glycol of 800 to 1200 and 1800 to 2200 molecular weight and polycaprolactone of 1500 to 2500 molecular weight and cured with a glycol of bis(betahydroxyethyl)hydroquinone ether and trimethylol propane.

5. The track segment of claim 3 wherein the olefin or diolefin elastomer is selected from butadiene/styrene polymer.

6. The track segment of claim 4 wherein the olefin or diolefin elastomer is selected from butadiene/styrene polymer.

* * * * *